United States Patent
Sabó

(10) Patent No.: US 6,168,165 B1
(45) Date of Patent: Jan. 2, 2001

(54) SEMI INTEGRATED SEALING SYSTEM

(75) Inventor: Alfredo Miguel Sabó, São Paulo (BR)

(73) Assignee: Sabo Industria E Comercio, Ltda., Sao Paulo (BR)

(*) Notice: Under 35 U.S.C. 154(b), the term of this patent shall be extended for 0 days.

(21) Appl. No.: 09/442,729

(22) Filed: Nov. 10, 1999

Related U.S. Application Data

(63) Continuation of application No. 08/760,899, filed on Dec. 6, 1996, now abandoned.

(30) Foreign Application Priority Data

Dec. 14, 1995 (BR) .................................................. 9505422

(51) Int. Cl.⁷ ........................................................ F16J 15/32
(52) U.S. Cl. ........................... 277/562; 277/572; 277/573
(58) Field of Search ................................... 277/353, 562, 277/564, 565, 566, 572, 573

(56) References Cited

U.S. PATENT DOCUMENTS

| | | | |
|---|---|---|---|
| 3,917,286 | * 11/1975 | Loyd ........................................ | 277/37 |
| 4,345,770 | * 8/1982 | Seeh ........................................ | 277/48 |
| 4,435,096 | * 3/1984 | Petros ..................................... | 277/402 |
| 4,437,821 | * 3/1984 | Ogawa .................................... | 418/104 |
| 4,928,980 | * 5/1990 | Deuring .................................. | 277/153 |
| 5,096,207 | * 3/1992 | Seeh et al. .............................. | 277/35 |
| 5,129,744 | * 7/1992 | Otto et al. ............................... | 277/412 |
| 5,152,538 | * 10/1992 | Mims ...................................... | 277/35 |
| 5,462,288 | * 10/1995 | Hering et al. ........................... | 277/37 |
| 5,553,870 | * 9/1996 | Czekansky et al. ................... | 277/134 |

* cited by examiner

Primary Examiner—Daniel G. DePumpo
(74) Attorney, Agent, or Firm—Brown & Wood, LLP

(57) ABSTRACT

A semi-integrated sealing system applied to the extremity of the output shaft (1) of the transmission case (2) of automotive vehicles and consisting substantially of assembling flange (10), static sealing element (20), which seals the interstice between the flange and gear shift block (2), and radial sealing retainer (30) around the shaft (10), with the mentioned flange (10) being a plate composed basically of peripherical holes (11) that receive the fastening screws to the transmission case and housing (12), receiver of the radial sealing retainer (30), the static sealing element (20) consisting of a thread of rubber type material (21), originally incorporated in the flange by means of vulcanization; the retainer of radial sealing (30) being of the cartridge type and mountable in the housing (12) of the assembling flange (10) around the output shaft (1) of the transmission case (2).

1 Claim, 3 Drawing Sheets

SEMI INTEGRATED SEALING SYSTEM

This application is a continuation of application Ser. No. 08/760,899 filed Dec. 6, 1996 now abandoned.

BACKGROUND OF THE INVENTION

This application relates a semi-integrated sealing system for a transmission case of automotive vehicles, which has been developed to provide a better performance and utilization, as well as more economy and other benefits in comparison to other similar sealing systems.

The most traditional sealing system for the transmission case of automotive vehicles consists of a sealing set made essentially of a device flange assembled on the transmission block (transmission case), a radial sealing retainer placed around the shaft and assembled on the flange by pressing, and a static sealing element, such as a cardboard, paste or another joint for sealing between the flange faces and the transmission block upon the transmission block fixing operation.

In spite of the large utilization of the set as described above, some inconveniences may occur, such as:

The flange, radial retainer and static sealing element, which compose the traditional set, are parts originally separated from one another and they are generally supplied to transmission block (case) manufacturers and/or vehicle assembling plants by different suppliers and have to be assembled together at the mentioned plants before being used in the assembling lines.

Such method of supplying the sealing sets results in the increase of the already large number of items that are contained in a vehicle and/or in a transmission case causing an increase in administrative procedures for supplying the assembly line, such as control of inventory, purchase, quality and others. The above-described usual sealing set, consisting of parts originally separated, requires pre-assembly of its parts before the use in the vehicle and/or transmission case manufacturing line, thus resulting in assembling sub-levels in assembling plants, which is incompatible with the automation level reached and/or intended for these production processes.

Another inconvenience observed when using the above traditional sealing set is due to the fact that, once assembled, it is difficult to find out the origin of and/or responsibility for eventual defects, since they can originate in the parts that constitute the set and/or in its assembly carried out at the plant using the final set.

On the other hand, with regard to the spare parts market, the traditional sealing set also causes some inconveniences, as generally it is applied to automotive vehicles at repair shops, which in the great majority may not have on hand all the resources necessary to perform a good assembly job, which may result in defects.

This is particularly observed as such traditional sets do not allow any control over the static sealing element that is between the flange and the transmission block during assembly, and for this reason the interstice in that area cannot be adequately sealed, leaving room for leakages.

Another aspect of the traditional sealing sets that may cause a defective assembly, when not all the adequate resources are used, is that the retainers of these traditional sealing sets have a radial sealing rim that seals directly against the shaft. Therefore, if the retainer is not precisely assembled in the flange housing and around the shaft, leakages may occur.

SUMMARY OF THE INVENTION

In view of the above problems and the intention to overcome them, the semi-integrated sealing system was developed, and it consists mainly of an assembling flange, a rubber static sealing thread, originally incorporated in the flange facing the transmission block, and a cartridge type retainer that is assembled in the flange housing and around the shaft of the transmission case outlet.

BRIEF DESCRIPTION OF THE DRAWINGS

The construction, performance and advantages over the traditional sealing set are demonstrated in the detailed description below and attached drawings, wherein.

DETAILED DESCRIPTION OF THE PREFERRED EMBODIMENT

Figure 1:
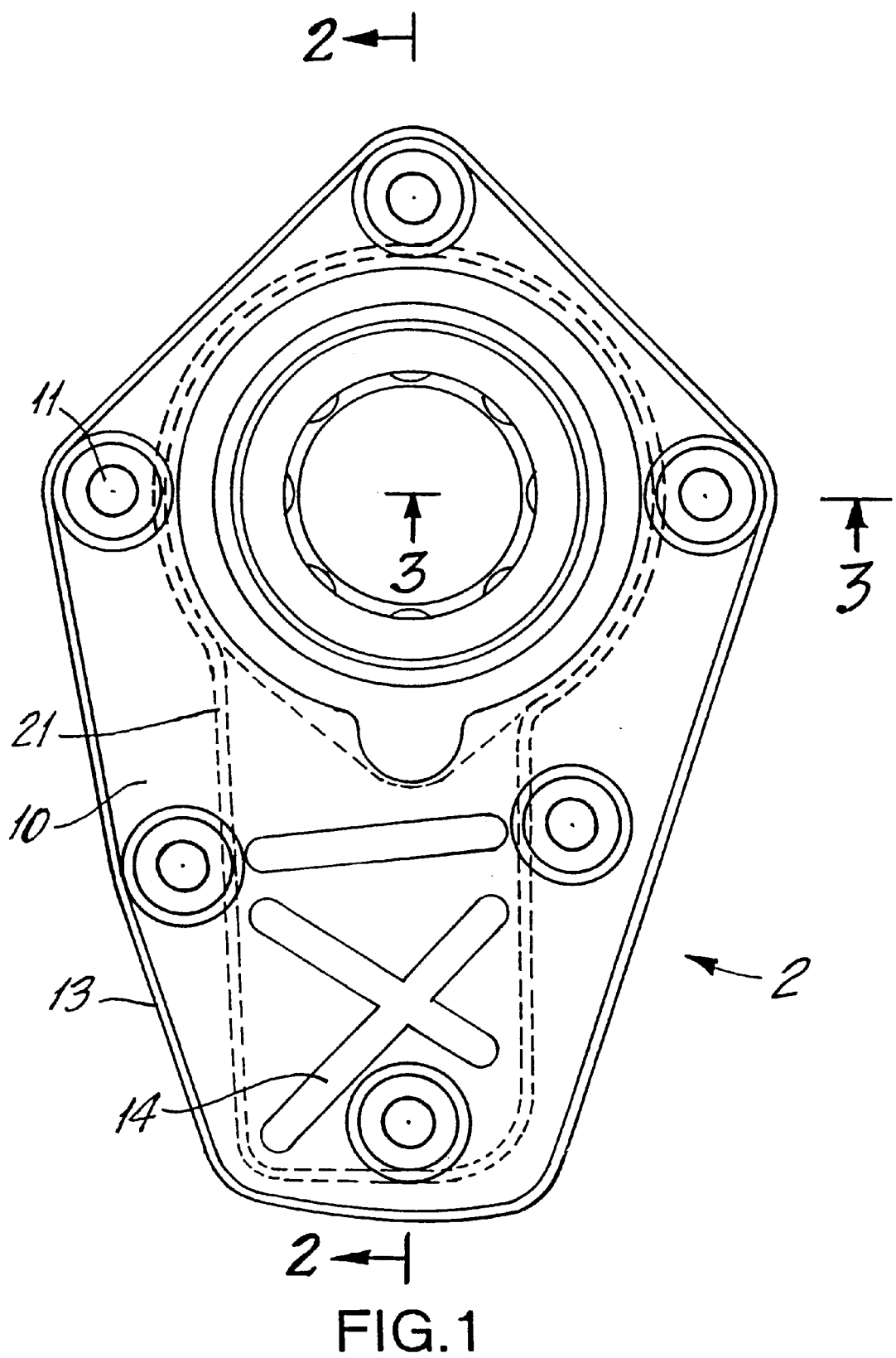
FIG. 1 shows the flange taken separately and from its face opposed to that turned to the gear shift case.
Figures 2, 3:
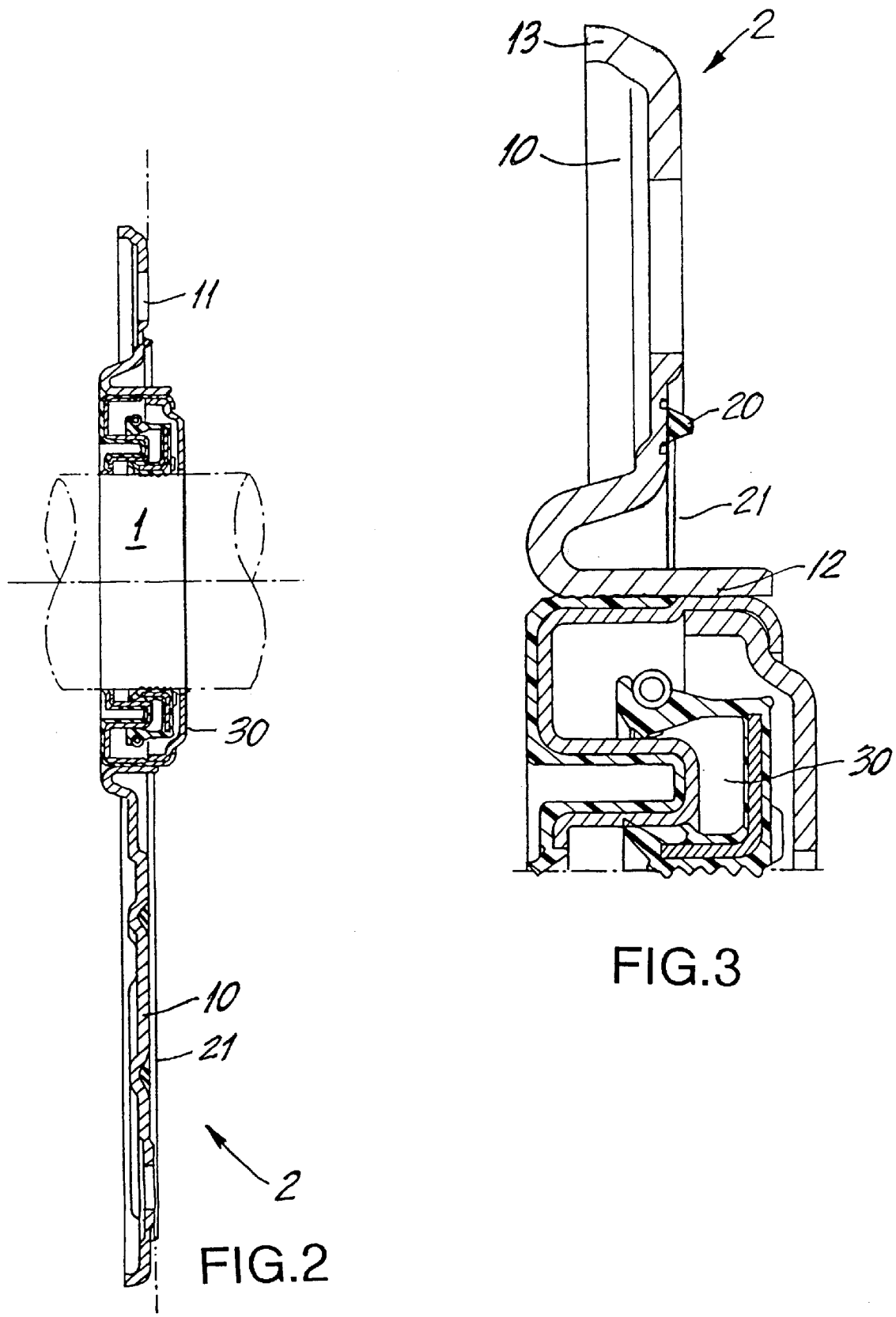
FIGS. 2 and 3 show cross-sections 2—2 and 3—3, respectively, contained in FIG. 1, and the indication of how the retainer is assembled on the flange and how the set is assembled at the use site.

The semi-integrated sealing system, which is shown in the drawings, used for sealing an output shaft 1 of a transmission case 2 (FIGS. 2 and 3) of automotive vehicles and consists substantially of an assembly flange 10, a static sealing element 20, which seals the interface between the flange and the transmission case 2, and a radial sealing retainer 30 arranged around the shaft 1.

In this invention, flange 10 is a plate having peripheral holes 11 that receive fastening screws for securing the flange 10 the transmission case 2. The flange 10 is formed integrally with a housing 12 in which a radial sealing retainer 30 is received. The static sealing element 20 consists of a thread of rubber type material 21, originally incorporated in the flange 10 by vulcanization process, configured as a closed ring that limits the flange area in which the housing 12 is placed. The retainer 30 seals against the transmission case 2, and the radial sealing retainer 30 is an integrated system of a radial sealing cartridge that is assembled in the flange housing 12, around the output shaft 1 of the transmission case 2.

The sealing semi-integrated system according to the present invention reduces the set pre-assembly operations before assembling at the use site, thus minimizing the inconveniences observed when using the traditional sealing set, and adjusts to the automation levels reached and/or intended for the assembly lines of manufacturers of transmission cases and/or assembling plants.

The sealing system has the additional advantage of facilitating the supply control of that item for a transmission case plant and/or assembling plants, as well as the audit work to detect eventual failures and other, since all the system components, forming a whole, have the same origin.

On the other hand, this system provides perfect control of the static sealing element 20 during assembly, independent of the torque applied to the fastening screws of the flange 10 and to the transmission case 2. The radial sealing retainer 30, being of cartridge type, enables a more accurate assembly around the shaft, thus avoiding possible leakages resulting from the assembly of separate parts.

This system being supplied with a cartridge type retainer provides better absorption of the axial motion at the transmission output and prevents the dust/impurities deposited on the area of the shaft and surface contact areas from affecting the sealing rim.

In view of its own system of track and sealing (shaft), surface finishing of the operational area of the sealing rim becomes dispensable and, therefore, the production becomes more economical.

When a part needs to be replaced, this sealing system provides an additional advantage as, due to having a cartridge type retainer, it does not have to be reworked for eliminating grooves caused by the contact with the shaft sealer, as this sealer works in its own integrated system.

In a preferred embodiment shown in the drawings, the assembly flange 10, within the basic configuration above, may have several variances selected to adapt to the assembly conditions, according to the model of the transmission case it is designed for. Rim 13, reinforcement grooves 14 and others, besides fastening holes, 11 and the housing 12 are parts of the flange 10.

The rubber thread 21, component of the static sealing element 20 has a cross-section designed to provide adequate sealing between the flange 10 and the transmission case 2 within the level of nominal tightness of the fastening screws of the flange 10 or within the large range of tightness levels above or below the nominal, so as to provide adequate sealing even if the set is assembled without using the ideal resources, as it occurs in certain mechanical repair shops and other without the required qualification.

Figure 4:
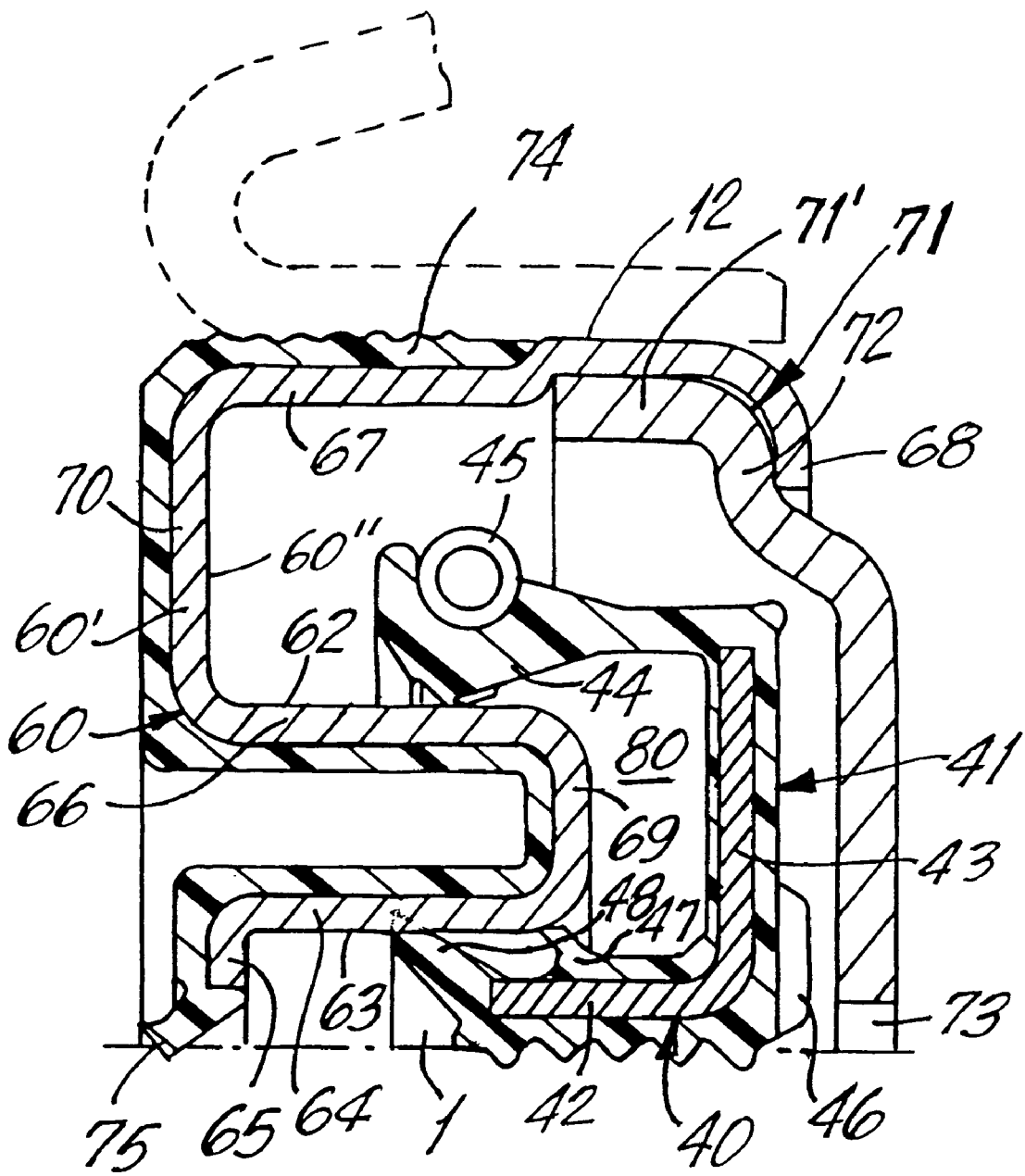
FIG. 4 shows a partial cross-sectional view of a cartridge-type retainer that is part of the sealing system according to the invention.

The cartridge type retainer 30, the preferred embodiment of which is shown in preferred FIG. 4, which shows a half of the retainer 30, is composed of an annular structural L-shaped element 40, and a sealing substantially C-shaped element of a rubber type 41 incorporated by vulcanization. The structural element 40 consists of an axial branch 42 located close to the shaft 1, and a radial branch 43 which is an extension of the branch 42 and has a bent profile. The sealing element 41 includes a first radial sealing rim 44 that works in conjunction with a garter type spring 45, and seals against a first track 62 of a housing 60. The hydrodynamic sealing grooves defined by ribs 46 formed on the surface of the radial structural element branch 43 and turned externally, enable the pumping of oil that may try to pass over the static sealing in relation to the shaft. Second 47 and third 48 sealing rims of the sealing element 41 provided on the free end of the axial branch 42 of the structural element 40 seal against a second axial track 63 of the housing 60.

The housing 60 consists basically of a structural member 60' and a sealing element of rubber type 61 incorporated by vulcanization, and is closed by substantially L-shaped cover 71. The structural member 60' is formed by a first substantially S-shaped part 60" made of a first internal extreme axial branch 64 with its free end forming a radial fold 65 turned inwardly, which defines the second sealing axial track 63, an intermediate axial branch 66 which defines the first sealing axial track 62, and a second external extreme axial branch 67 longer than the internal branch 64 and having a profile slightly resembling a S-profile and ended in radial point 68 turned inwardly. The first part 60" of the structural member 60' of the housing 60 consists of two radial displaced branches 69, 70 which interconnect the axial branches 64, 66 and 67.

The sealing element 61 of the housing 60 consists of a rubber layer that covers the external surface of the first part 6011 of the structural element 60' of the housing 60, from the extreme radial fold 65 up to the medium fold of the second external extreme axial branch 67. This defines the layer 74 that seals against the housing 12 of the assembly flange 10; and the radial extreme fold 65 defines the sealing rim 75 on shaft 1.

The L-shaped cover 71 consists of an axial branch 71' that is assembled on the internal surface of the second external extreme axial branch 67, and a radial branch 72 having a profile slightly resembling a S-profile adjacent to the radial branch 43 of the radial sealing element, which ends near shaft 1 and defines an annular space 73, at which level the hydrodynamic sealing ribs/groves 46 are placed.

The internal space of the retainer 30, which is formed between the radial sealing element 40 and housing 60, is filled with grease 80.

Within the basic construction mentioned above, it is required that changes may be introduced to the semi-integrated sealing system as far as materials, dimensions and construction details are concerned, without departure from the scope of the present invention.

What is claimed is:

1. A semi-integrated system for sealing an output shaft of a transmission case, the system comprising:

a flange being formed as a plate having a plurality of peripheral openings for receiving fastening screws for attaching the flange to the transmission case, and the flange including a flange housing formed integrally with the flange and adapted to surround the output shaft of the transmission case;

a static sealing element for sealing an interface between the flange and the transmission case and formed as a thread of a rubber material incorporated in the flange by vulcanization, the static sealing element being formed as a closed ring member surrounding a flange area within which the housing is located; and a retainer for sealing the output shaft of the transmission case and formed as a cartridge received in the flange housing, the sealing retainer comprising:

a structural member having spaced first and second axial tracks, static sealing means formed integrally with the structural member for sealing the structural member against the flange housing, and dynamic sealing means comprising a first radial sealing rim sealingly engaging the first axial track, spaced second and third radial sealing rims sealingly engaging the second axial track, and a hydrodynamic sealing, wherein the structural member and the dynamic sealing means form together a cavity for receiving grease for auto-lubrication of inner areas of the retainer and define an obstacle labyrinth that prevents entering of dirt into the grease receiving cavity, wherein the structural member comprises a structural, substantially S-shaped member having an external axial branch, an intermediate axial branch defining the first axial track, an internal axial branch shorter than the external axial branch and defining the second axial track, and first and second radial branches connecting, respectively, the external axial branch with the intermediate axial branch and the intermediate axial branch with the internal axial branch;

wherein the dynamic sealing means comprises a structural, substantially L-shaped element having an axial branch which, in a mounted condition of the sealing system, is adapted to be located adjacent to the output shaft of the transmission case, and a radial branch; a substantially C-shaped sealing element formed of a rubber type material and connected by vulcanization with the substantially L-shaped element, the dynamic sealing means having a first axial branch adapted to be remote, in the mounted condition of the sealing system, from the output shaft and defining the first sealing rim, the first axial branch extending from a free end of the radial branch of the substantially L-shaped element, a second axial branch co-extensive with the axial branch of the substantially L-shaped element and defining the second and third rims located at a free end of the axial branch of the substantially L-shaped element, a radial branch connecting the first and second axial branches, and externally turned ribs formed on the outer surface of the radial branch of the substantially L-shaped element and defining the hydrodynamic sealing;

wherein said static sealing means further comprises a sealing element formed as a layer of a rubber material covering the structural substantially S-shaped element for sealing against the output shaft; and wherein the retainer further comprises a garter spring for biasing the first sealing rim against the first track, and a substantially L-shaped structural cover having an axial branch engaging an inner surface of the external axial branch of the substantially S-shaped member, and a radial branch having a front portion covering the radial branch of the sealing element.

* * * * *